United States Patent
Narahashi et al.

(10) Patent No.: US 9,185,250 B2
(45) Date of Patent: Nov. 10, 2015

(54) MAINTENANCE DEVICE FOR USE WITH AN IMAGE FORMING APPARATUS

(75) Inventors: Masaki Narahashi, Tokyo (JP); Sou Miyazaki, Tokyo (JP); Reiji Murakami, Yokohama (JP); Yoshikatsu Kamisuwa, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 211 days.

(21) Appl. No.: 13/616,176

(22) Filed: Sep. 14, 2012

(65) Prior Publication Data

US 2013/0070299 A1    Mar. 21, 2013

(30) Foreign Application Priority Data

Sep. 21, 2011 (JP) .................................. 2011-206299
Aug. 9, 2012 (JP) .................................. 2012-176988

(51) Int. Cl.
| | |
|---|---|
| G06F 3/12 | (2006.01) |
| H04N 1/00 | (2006.01) |
| G03G 15/00 | (2006.01) |
| H04N 1/32 | (2006.01) |

(52) U.S. Cl.
CPC ....... *H04N 1/00411* (2013.01); *G03G 15/5079* (2013.01); *H04N 1/00344* (2013.01); *H04N 1/00474* (2013.01); *H04N 1/00832* (2013.01); *H04N 1/00965* (2013.01); *H04N 1/00973* (2013.01); *H04N 1/32106* (2013.01); *H04N 2201/0094* (2013.01); *H04N 2201/3204* (2013.01); *H04N 2201/3205* (2013.01); *H04N 2201/3273* (2013.01); *H04N 2201/3274* (2013.01); *H04N 2201/3278* (2013.01)

(58) Field of Classification Search
USPC .............................................. 358/1.14, 1.15
See application file for complete search history.

(56) References Cited

U.S. PATENT DOCUMENTS

| | | | |
|---|---|---|---|
| 2006/0294252 A1* | 12/2006 | Shoji et al. ..................... | 709/230 |
| 2007/0067681 A1* | 3/2007 | Hikawa et al. .................. | 714/47 |
| 2008/0062883 A1* | 3/2008 | Shima ............................. | 370/241 |
| 2008/0243726 A1* | 10/2008 | Hasegawa ....................... | 705/400 |
| 2008/0273882 A1* | 11/2008 | Yamaguchi ........................ | 399/8 |
| 2008/0316527 A1* | 12/2008 | Lee ................................ | 358/1.15 |
| 2009/0031176 A1* | 1/2009 | Ide et al. .......................... | 714/47 |

(Continued)

FOREIGN PATENT DOCUMENTS

| | | |
|---|---|---|
| JP | 2001-034447 | 2/2001 |
| JP | 2003-066784 | 3/2003 |
| JP | 2005-165036 | 6/2005 |

OTHER PUBLICATIONS

First Office Action of Reasons for Rejection for Japanese Patent Application No. 2012-176988 Dated Apr. 1, 2014, 5 pgs.

*Primary Examiner* — Benjamin O Dulaney

(74) *Attorney, Agent, or Firm* — Amin, Turocy & Watson, LLP

(57) ABSTRACT

According to one embodiment, a maintenance device includes a first interface, a second interface, and a processor. The first interface is configured to acquire setting information read by a reading unit configured to read the setting information from the information processing device. The communication unit is configured to acquire statistical information concerning the setting information from an external device via a network. The processor is configured to compare the setting information to the statistical information and evaluate the setting information based on a comparison result.

9 Claims, 20 Drawing Sheets

(56) References Cited

U.S. PATENT DOCUMENTS

| | | | |
|---|---|---|---|
| 2009/0033993 A1* | 2/2009 | Nakazato et al. | 358/1.15 |
| 2009/0066737 A1* | 3/2009 | Sakurai | 347/9 |
| 2009/0174903 A1* | 7/2009 | Wright | 358/1.15 |
| 2010/0088609 A1* | 4/2010 | Kawana | 715/740 |
| 2010/0271663 A1* | 10/2010 | Kadota | 358/1.15 |
| 2013/0073908 A1 | 3/2013 | Miyazaki et al. | |

* cited by examiner

T1

| Global ID | Local ID | Serial number | Model name | Error information |
|---|---|---|---|---|
| 001-0001 | 0001 | AB001 | Type A | |
| 001-0002 | 0002 | AB002 | Type A | |
| 100-0100 | 0003 | AA001 | Model A | |
| 100-0101 | 0004 | AB001 | Model A | |
| 100-0102 | 0005 | AC001 | Model A | |
| 100-0103 | 0006 | AD001 | Model A | |

Apparatus information table

F I G. 4

T2

| Global ID | Local ID | Serial number | Model name | Drive time | Print number | Jam occurrence number | ---- |
|---|---|---|---|---|---|---|---|
| 001-0001 | 0001 | AB001 | Type A | 10000 | 100 | 3 | ---- |

Error information table

F I G. 5

T3

| DB column name | Log data title |
|---|---|
| Drive time | Execution time |
| Drive time | Execution time |
| Print number | Print number |
| Print number | Print counter |

Database column name and
log data title correspondence table

F I G. 6

T4

| Local ID | Model name | Setting code | Setting value |
|---|---|---|---|
| 0001 | Type A | 1150 | 300 |
| 0001 | Type A | 1152 | 200 |
| .... | | .... | .... |

Apparatus setting list

F I G. 7

T5

| Model name | Setting code | Sample number | Average value | Mode | Standard deviation | Threshold value |
|---|---|---|---|---|---|---|
| Type A | 1150 | 10000 | 300.5 | 290 | 15.0 | 150, 350 |
| Type A | 1152 | 10000 | 143.3 | 150 | 20.1 | 120, 160 |
| .... | .... | .... | .... | .... | .... | .... |
| Type A | 2160 | 10000 | - | OFF | - | OFF |
| .... | .... | .... | .... | .... | .... | .... |

Total data list

F I G. 8

T6

| Serial number | Model name | Setting code | Setting value | Average value | Mode |
|---|---|---|---|---|---|
| AB001 | Type A | 1150 | 210 | 300.5 | 290 |
| AB0028 | Model A | 1152 | 110 | 143.3 | 150 |
| CA0101 | ZZZ-X | 2160 | ON | - | OFF |
| .... | .... | .... | .... | .... | .... |

Outlier list

F I G. 9

T7

| Classification | Setting item name | Classification | Setting item name |
|---|---|---|---|
| Process | Charging grid bias adjustment | Scanner | CCD main scanning deviation |
| Process | High-pressure manual adjustment charging | Scanner | Scanner minor scanning deviation |
| Process | High-pressure manual adjustment color development | Scanner | Scanner minor scanning magnification |
| Process | High-pressure manual adjustment primary transfer constant voltage | Scanner | Distortion |
| Process | High-pressure manual adjustment secondary transfer constant voltage | Scanner | Shading position adjustment |
| Process | High-pressure manual adjustment diselectrification blade | Scanner | ADF aligning amount |
| Process | High-pressure manual adjustment secondary constant current | Scanner | ADF conveyance speed fine adjustment |
| Process | Charging grid correction voltage value | Scanner | ADF horizontal deviation |
| Process | Development bias correction voltage value | Scanner | ADF leading end position adjustment |
| Process | Laser power correction light quantity value | Scanner | Carriage position adjustment at the time of ADF reading |
| Process | Laser power correction light standard D/A value | | |
| Process | Vo sensor output | Printer | Polygon motor rotation fine adjustment |
| Process | Potential sensor output when Vo sensor shutter is closed | Printer | Laser embossing position |
| Process | Laser power output adjustment | Printer | ADU conveyance motor speed fine adjustment |
| Process | Primary transfer bias standard mode execution value | Printer | Cassette horizontal deviation adjustment |
| Process | Primary transfer resistance detection offset | Printer | ADU horizontal deviation adjustment |
| Process | Primary transfer front and back end bias execution value | Printer | Top margin |
| Process | Primary transfer front and back end bias correction coefficient | Printer | Left margin |
| Process | Secondary transfer bias color execution value | Printer | Right margin |
| Process | Secondary transfer bias monochrome execution value | Printer | Bottom margin |
| Process | Paper surface bias offset | Printer | Top margin |
| Process | Paper surface secondary front and back bias correction coefficient | Printer | Left margin |

| Classification | Setting item name | Classification | Setting item name |
|---|---|---|---|
| Process | Primary transfer constant current trans adjustment value | Printer | Right margin |
| Process | Primary transfer constant voltage trans adjustment value | Printer | Bottom margin |
| Process | Secondary transfer constant current trans adjustment value | Printer | Leading end position adjustment CST1 adjustment value |
| Process | Secondary transfer constant voltage trans adjustment value | Printer | Leading end position adjustment CST2 adjustment value |
| Process | Diselectrification bias adjustment value | Printer | Leading end position adjustment CST3 adjustment value |
| Process | High-pressure manual adjustment diselectrification blade (high) | Printer | Leading end position adjustment CST4 adjustment value |
| Process | High-pressure manual primary transfer constant current | Printer | Leading end position adjustment input adjustment value |
| Process | Fixation temperature (heat roller) | Printer | Leading end position adjustment ADU adjustment value |
| Process | Heater compulsion on time | Printer | Leading end position adjustment TLCF adjustment value |
| Process | Fixation temperature (press roller) | Printer | Leading end position adjustment OLCF adjustment value |
| Process | First print pre-run operation time | Printer | First cassette aligning amount |
| Process | Abnormal processing start fixation temperature setting | Printer | Second cassette aligning amount |
| Process | Compulsion heater on number threshold value | Printer | Input paper feeding aligning amount |
| Process | Ready permission temperature range | Printer | Third cassette aligning amount |
| Process | Ready pre-run fixation motor deceleration | Printer | Fourth cassette aligning amount |
| Process | Ready pre-run operation time | Printer | ADU paper feeding aligning amount |
| Process | Ready time fixation temperature | Printer | Tandem LCF paper feeding aligning amount |
| Process | Ready temperature drop switch time | Printer | Input press amount adjustment |
| Process | Print start permission temperature range | Printer | Drum motor fine adjustment |
| Process | Print operation temperature maintaining time setting when the print is finished | Printer | Resist motor speed fine adjustment |
| Process | Fixation control temperature lower limit value | Printer | Transfer belt motor speed fine adjustment |
| Process | Print temperature drop switch time | Printer | Heat roller speed fine adjustment |
| Process | Ready permission temperature correction at the time of preheat return | Printer | Paper feeding motor speed fine adjustment |

F I G. 10B

| Classification | Setting item name | Classification | Setting item name |
|---|---|---|---|
| Process | Time limit setting at the time of a sleep/preheat return | Printer | Fixation paper ejecting motor speed fine adjustment |
| Process | Print speed conversion temperature | Printer | Skew deviation amount adjustment value |
| Process | Electric power variable lower limit | Printer | Polygon motor stop time |
| Process | Electric power variable width | Printer | Paper feeding retry recovery setting value |
| Process | Lower limit maintaining temperature width at the time of electric power drop | Printer | Manual stay pull time-out time |
| Process | Heating time at the time of preheat | Printer | Positioning continuous print stop designation time [minute] |
| Process | Controlled temperature maintaining time at the time of a sleep return | | |
| Process | Fixation temperature transition time at the time of preheat | System | Default setting value of blank determination adjustment threshold value at the time of power-on |
| Process | Fixation temperature increment at the time of preheat transition | | |

FIG. 10C

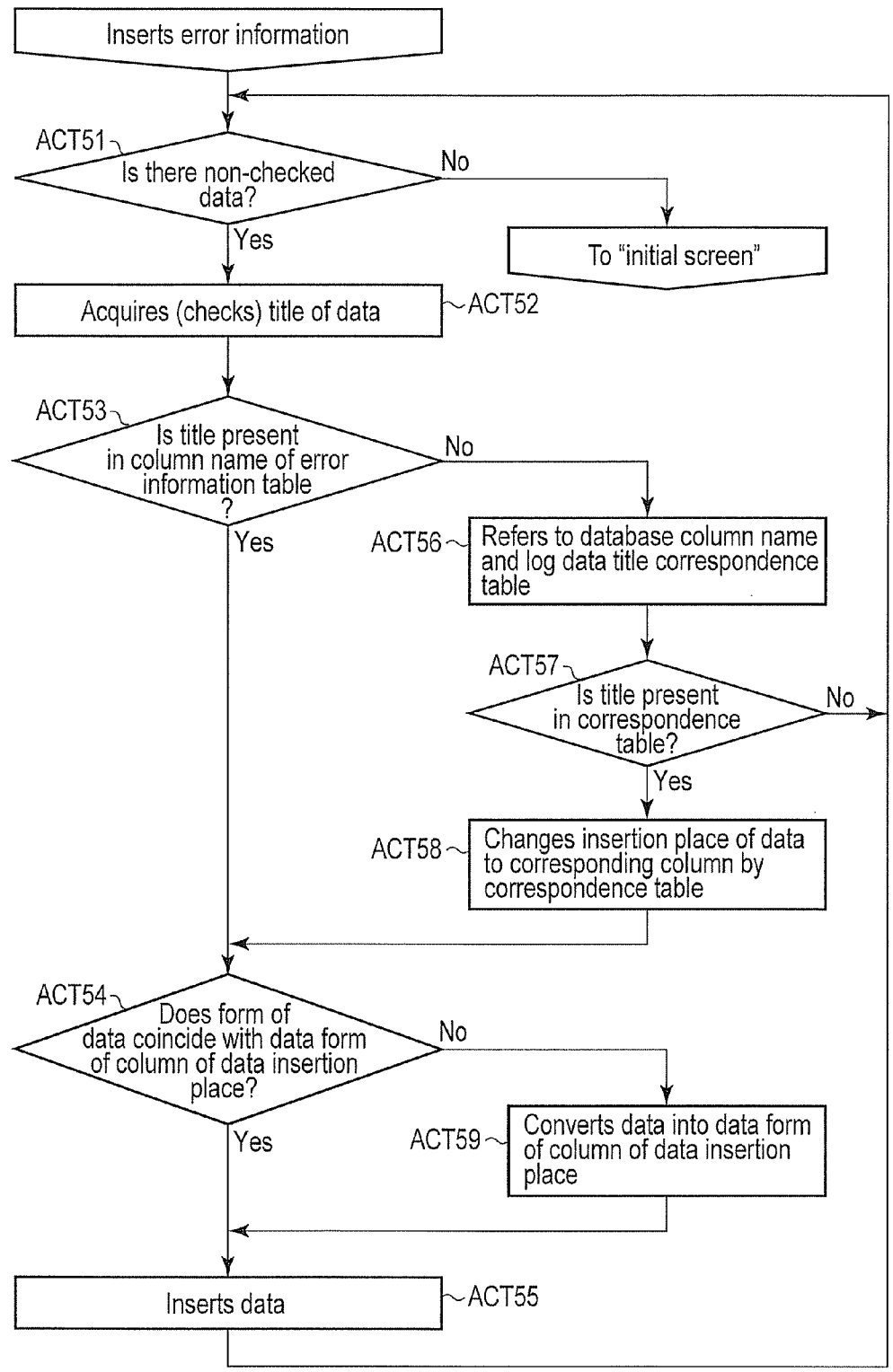
F I G. 20

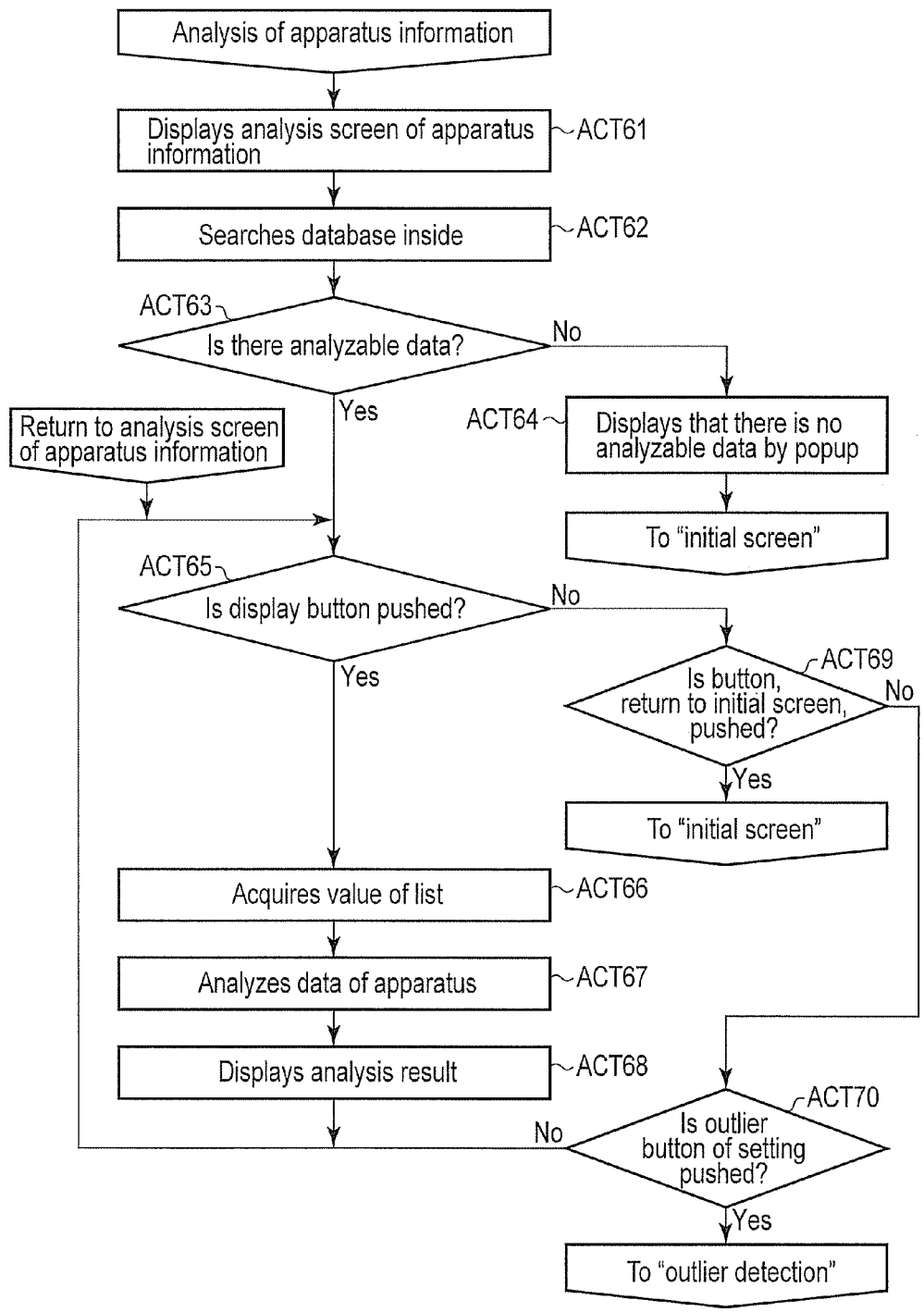
F I G. 21

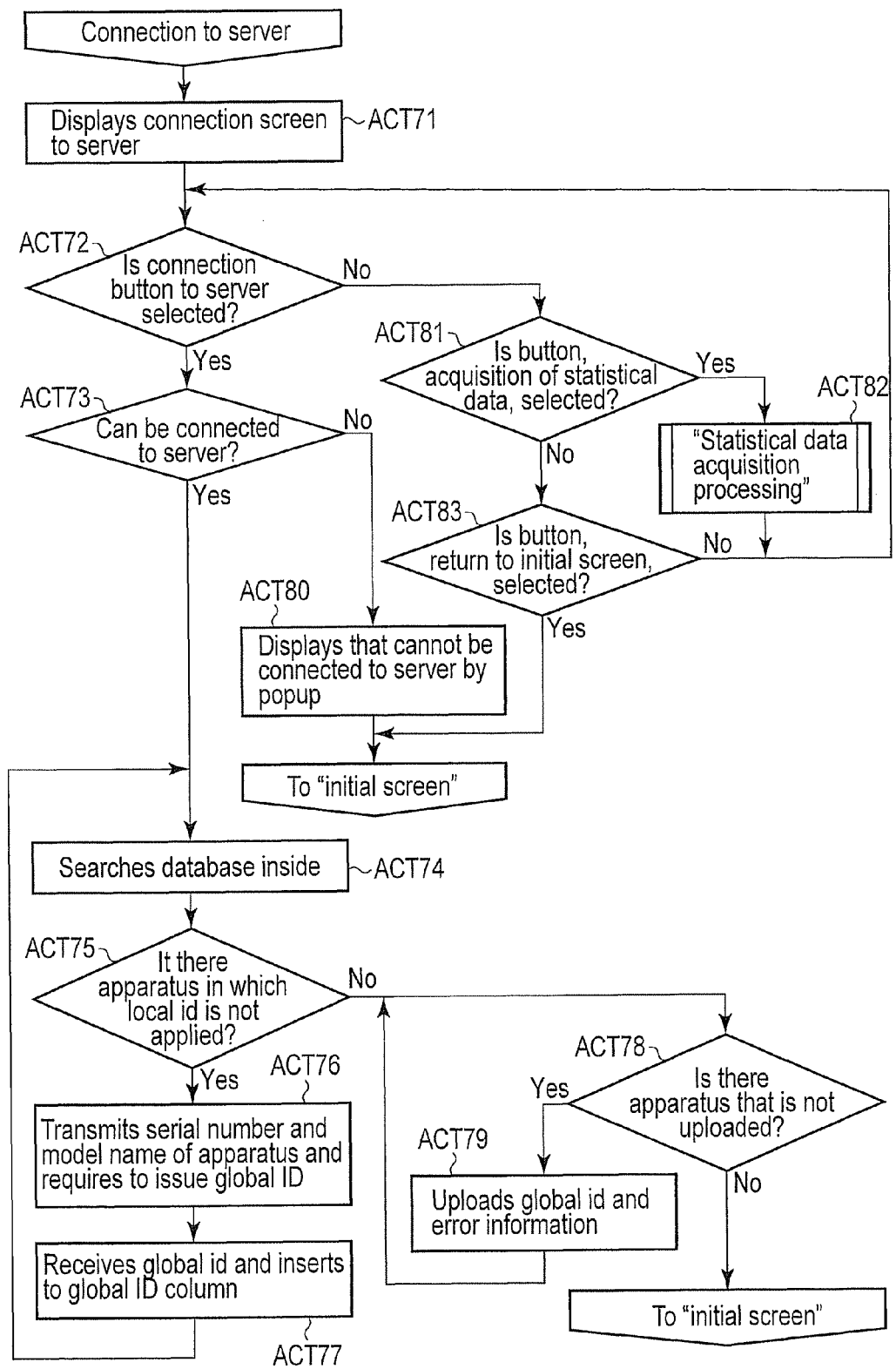
F I G. 22

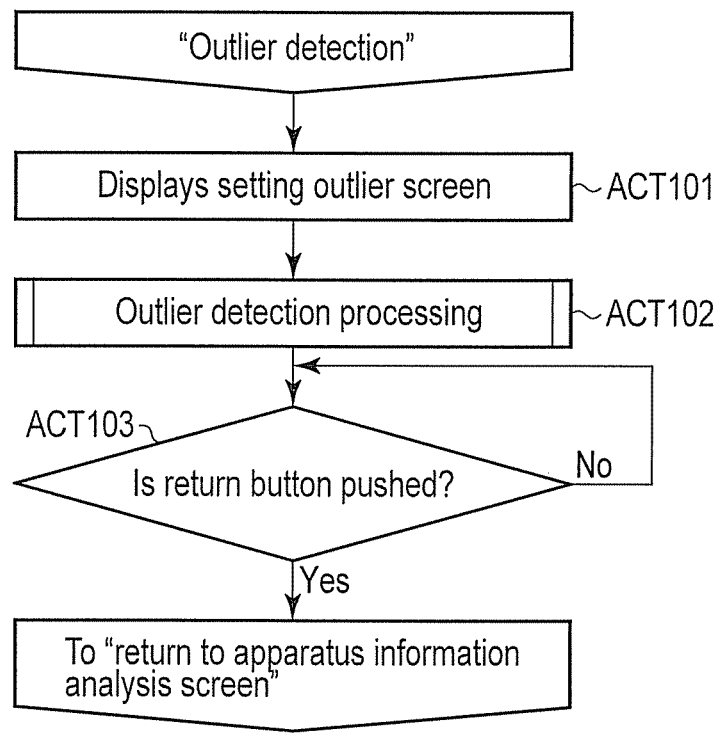
F I G. 24

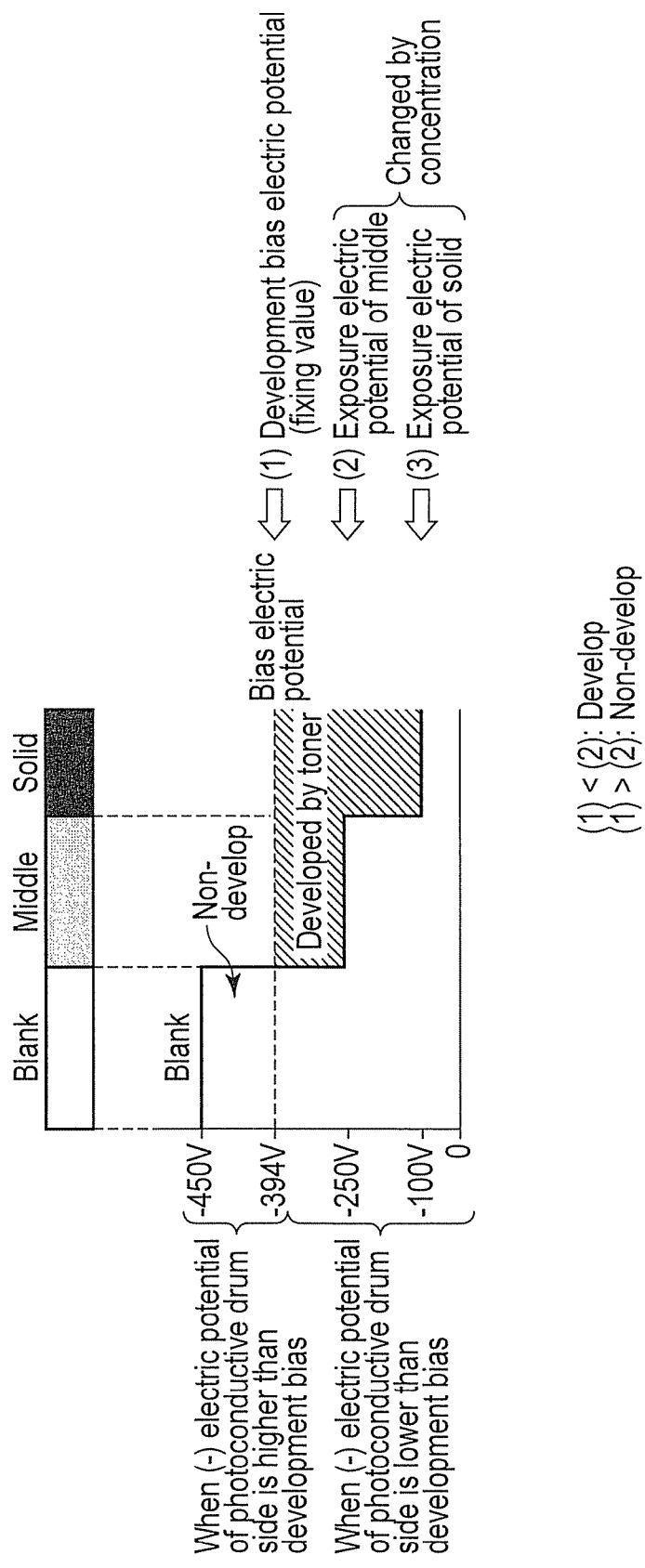
F I G. 26

MAINTENANCE DEVICE FOR USE WITH AN IMAGE FORMING APPARATUS

CROSS-REFERENCE TO RELATED APPLICATIONS

This application is based upon and claims the benefit of priority from Japanese Patent Applications No. 2011-206299, filed on Sep. 21, 2011; and No. 2012-176988, filed on Aug. 9, 2012; the entire contents of both of which are incorporated herein by reference.

FIELD

Embodiments described herein relate generally to a maintenance device and a maintenance method.

BACKGROUND

In the related art, in the maintenance of image forming apparatuses, when an abnormality occurs in an image forming apparatus, the situation is conveyed to a serviceman via a telephone call from a user. Moreover, a serviceman visits an installation location and checks the situation.

Furthermore, recently, in order to further improve service characteristics, a method is adopted in which, when detecting an abnormality, the apparatus in an on-line state (a state of being connected to a communication line such as the internet) automatically transmits apparatus information and error information to a service center using the communication line. Furthermore, at the same time, by referring to apparatus information such as a machine type, a machine number, an occurrence time, an apparatus situation, an error message and using such information, service characteristics can be improved.

However, in a current market, a considerable number of apparatuses in off-line states (a state of not being connected to a communication line such as the internet) still exist. Furthermore, even if the apparatus is connected to a communication line such as the internet, from a security problem, there are many apparatuses that do not provide the apparatus information (for convenience, an apparatus of such a state is referred to as a "apparatus in an off-line state" hereinafter).

In an apparatus in an off-line state, there are methods of storing the data of the apparatus information of an image forming apparatus in a PC owned by a serviceman temporarily, taking the serviceman's PC back to the service station and performing analysis of the data using the server, or switching the PC to an on-line state after storing the data, connecting the PC to the server and performing analysis at once.

In the maintenance of the image forming apparatuses of the related art, a serviceman is able to alter the settings of the apparatus from the state at the time of factory shipment according to the use frequency and the application of the apparatus. The settings of the apparatus are, for example, setting items concerning the behavior of the image forming apparatus such as adjustment of a scan position, paper margin adjustment, and motor speed adjustment. At this time, in some cases, an item is erroneously set to an unintentional value or an uncommon value. Since any value is reflected as setting, the value itself cannot be referred to as an error, and it is difficult for the person in question to notice.

However, depending on the combination of the setting values, by continuing in such a state, the apparatus may potentially cause an error as a result. In order to prevent such a situation in advance, it is effective to show a user how uncommon the setting values of the apparatus are. In the system of the related art, malfunction of an image forming apparatus can be diagnosed, but it is hard to detect whether or not the setting values deviate from common settings. It is difficult to detect whether or not the setting values of various information processing devices deviate from the general setting without being limited to the image forming apparatus mentioned above.

BRIEF DESCRIPTION OF THE DRAWINGS

FIG. 4 is an explanatory diagram that describes an example of an apparatus information table T1 of the maintenance device.

FIG. 5 is an explanatory diagram that describes an example of an error information table T2 of the maintenance device.

FIG. 6 is an explanatory diagram that describes an example of a database column name and log data title correspondence table T3 of the maintenance device.

FIG. 7 is an explanatory diagram that describes an example of an apparatus setting list T4 of the maintenance device.

FIG. 8 is an explanatory diagram that describes an example of a statistical data list T5 of the maintenance device.

FIG. 9 is an explanatory diagram that describes an example of an outlier list T6 of the maintenance device.

FIGS. 10A, 10B, and 10C illustrate a list of setting items of the image forming apparatus that is evaluated by the maintenance device.

FIG. 20 is a flow chart that describes "insertion of error information" of the maintenance device.

FIG. 21 is a flow chart that describes "analysis of apparatus information" of the maintenance device.

FIG. 22 is a flow chart that describes "connection to a server" of the maintenance device.

FIG. 24 is a flow chart that describes "outlier detection processing" of the maintenance device.

FIG. 26 is an explanatory diagram of a situation where the setting values of a development bias electric potential setting of the maintenance device is not suitable.

DETAILED DESCRIPTION

Various embodiments will be described hereinafter with reference to the accompanying drawings.

In general, according to one embodiment, a maintenance device includes a first interface, a second interface, and a processor. The first interface is configured to acquire read setting information which is read by a reading unit configured to read the setting information from the information processing device. The communication unit is configured to acquire statistical information concerning the setting information from an external device via a network. The processor is configured to compare the setting information to the statistical information and evaluate the setting information based on a comparison result.

Figure 1:
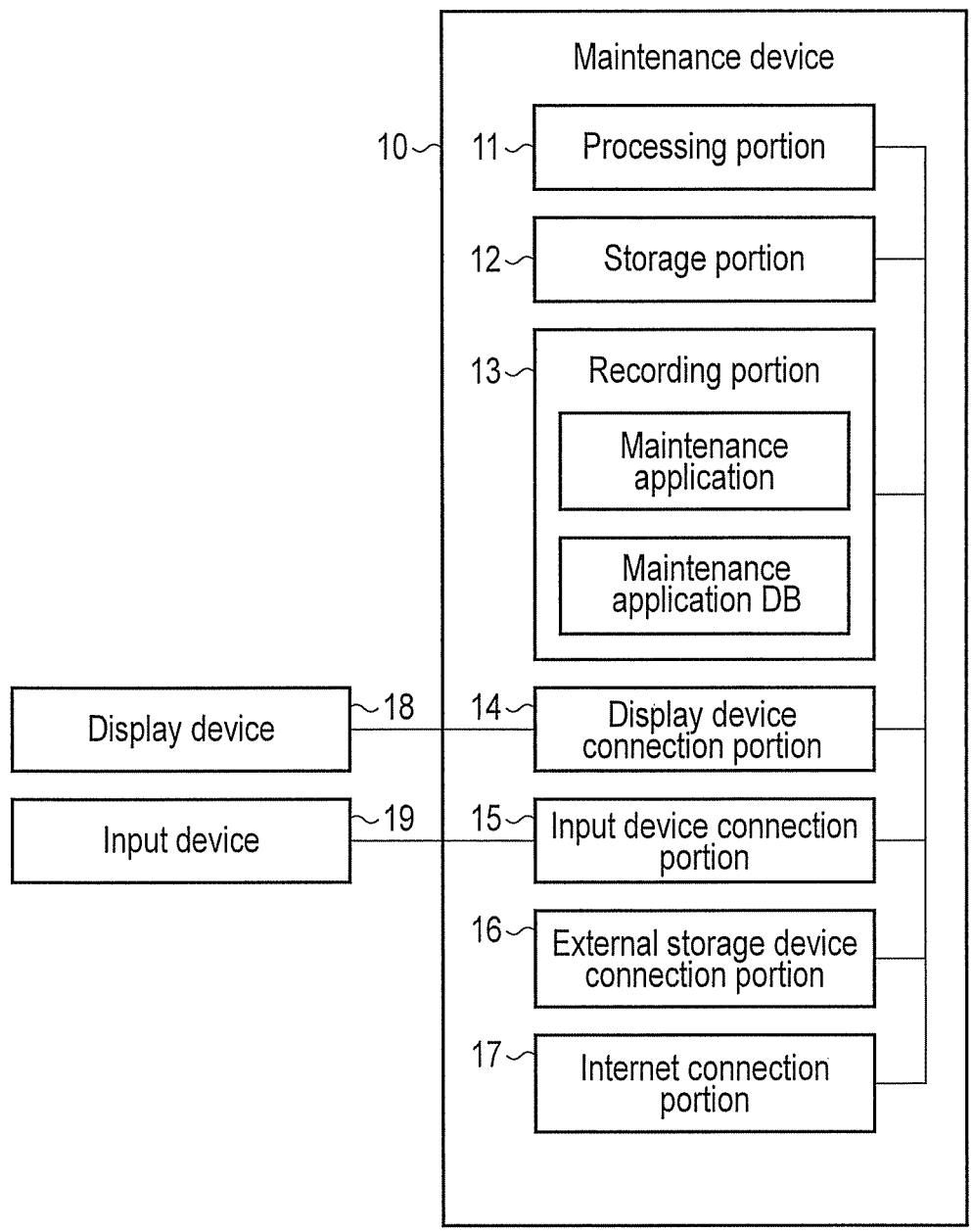
FIG. 1 is a block diagram that illustrates an example of a configuration of a maintenance device according to an exemplary embodiment.

An example of a configuration of the maintenance device 10 of the exemplary embodiment will be described below using FIG. 1. As shown in FIG. 1, the maintenance device 10 has a processing portion 11 such as a processor, a memory portion 12 such as a memory, a recording portion 13 such as a HDD (Hard Disk Drive) and a memory, a display device connection portion 14 that generates and supplies image information for being displayed on a display device 18 such as a display, an input device connection portion 15 serving as an interface with an input device 19 such as a mouse and a keyboard, an external recording device connection portion 16 serving as the first interface of an external storage medium such as a USB (Universal Serial Bus) memory 1, and an internet connection portion 17 serving as the second interface that performs communication with a network such as the internet. The external storage medium also serves as the reading unit.

However, since it is premised that the maintenance device 10 is carried to an apparatus installation location by a serviceman, the maintenance device preferably has a form capable of being conveyed by the serviceman, for example, a notebook PC or an equivalent form.

Figure 2:
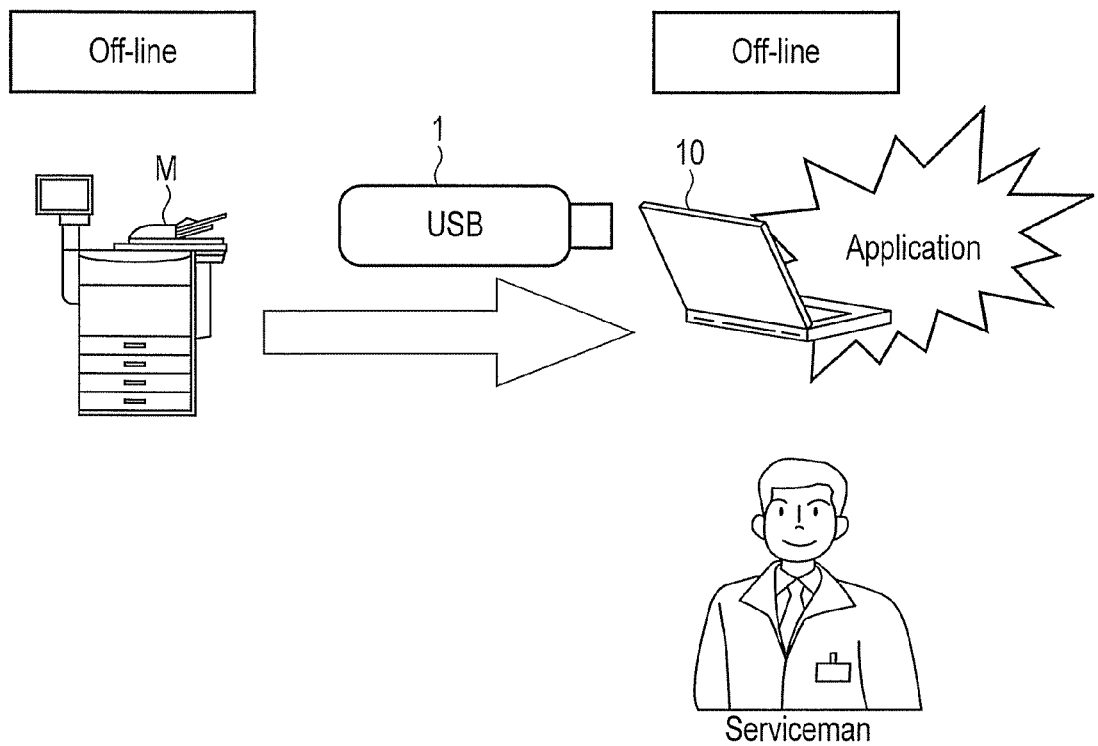
FIG. 2 is an outline view that illustrates an example of a relationship between an image forming apparatus and the maintenance device.

Furthermore, as shown in FIG. 2, in the present embodiment, a situation is assumed where the setting information or the like is not supplied to the maintenance device 10 via a network such as a LAN in an on-line manner, but the setting information or the like is supplied to the maintenance device 10 or the like via an attachable or detachable recording medium such as a USB (Universal Serial Bus) memory in an off-line manner. The situation is assumed considering that, in the current market, a considerable number of information processing devices such as image forming apparatuses in an off-line state (a state of not being connected to the communication line such as an internet) are still present, and even if the device is connected to the communication line such as the internet, from a problem of security, there are also many apparatuses that do not provide the apparatus information.

Figure 3:
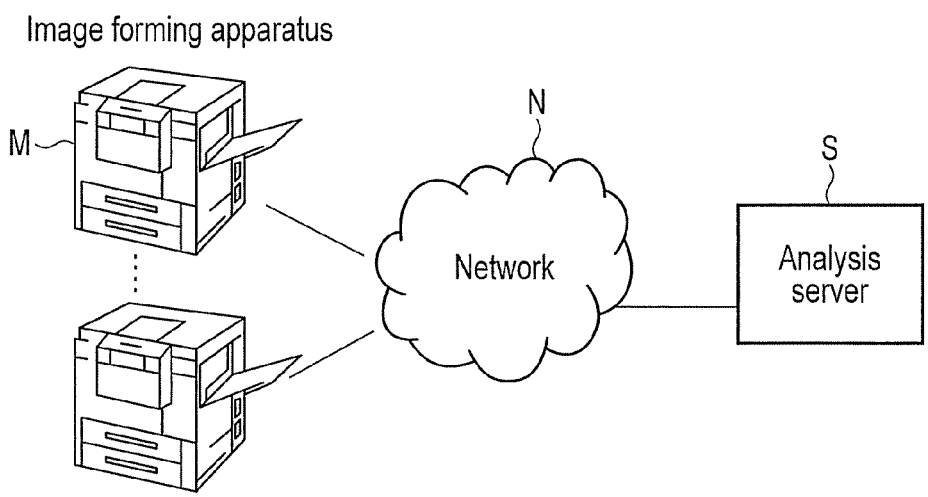
FIG. 3 is an explanatory diagram that illustrates an example of a relationship between the image forming apparatus and an analysis server.

Furthermore, as shown in FIG. 3, in an image forming apparatus M according to the present exemplary embodiment, the setting value thereof are automatically collected and accumulated by an analysis server S in a state of being connected by a network N, and the statistical data is renewed in the analysis server S.

Furthermore, data is stored in a recording portion 13 of the maintenance device 10 of the present exemplary embodiment. That is, the data includes an image forming apparatus maintenance application (hereinafter, referred to as an "application), and an image forming apparatus maintenance application database (hereinafter, referred to as a "database").

Herein, as an example, the database is constituted by the tables mentioned below.

That is, the tables include an apparatus information table T1, an error information table T2, a database column name and log data title correspondence table T3, an apparatus setting list T4, a statistical data list T5, an outlier list T6, and a setting item list T7 which serves as an evaluation target.

As shown in FIG. 4, as an example, the apparatus information table T1 is constituted by the columns. The columns include a global ID (allocation identification information) that is an identification number specific to each apparatus and is given by the analysis server S, a local ID that is a reference number in the apparatus information table T1, a serial number (apparatus identification information) that is an identification number specific to each apparatus and is given by a maker, a model name that specifies the machine type (registration machine type identification information), and error information detected in the apparatus. The registration apparatus identification information and the registration machine type identification information may also be collectively referred to as registration apparatus identification information.

Next, as shown in FIG. 5, the error information table T2 is constituted by the columns as below. The columns include a global ID that is an identification number specific to each apparatus and is given by the analysis server S, a local ID that is a reference number in the apparatus information table T1, a serial number that is an identification number specific to each apparatus and is given by a maker, a model name that specifies the machine type, a drive time that is a driving time of the apparatus, a print number that is the total number printed by the apparatus or a print number of a day, and a jam occurrence number that records the number of occurrences of paper jams or the like in the apparatus.

As shown in FIG. 6, the database column name and log data title correspondence table T3 is constituted by a DB (database) column name and a column of the log data title.

That is, the drive time corresponds to an execution time or a number of service hours, and the print number corresponds to the print number or the print count.

As shown in FIG. 7, the apparatus setting list T4 is constituted by the columns as below.

That is, the columns include a local ID that is a reference number in the apparatus setting list T4, a model name that specifies the machine type, a setting code that is a code allocated to the setting item of the image forming apparatus becoming the target of the evaluation, and a setting value that is a value set in the setting items.

As shown in FIG. 8, the statistical data list T5 is constituted by the columns as below.

That is, the columns include a model name that specifies the machine type, a setting code that is a code allocated to the setting item of the image forming apparatus becoming the target of the evaluation, a sample number that means the number of samples used when making the statistics, an average value that is an average value of the values of the sample, a mode that means the most frequent value of the sample, a standard deviation of the sample, and a threshold used in the determination of whether or not a setting value is an outlier.

As shown in FIG. 9, the outlier list T6 is constituted by the columns as below. That is, the columns include a serial number that is an identification number specific to each apparatus and is given by a maker, a model name that specifies the machine type, a setting code that is a code allocated to the setting item of the image forming apparatus becoming the target of the evaluation, a setting value that is a value set in a setting item, an average value that is an average of the values of the sample, and a mode that means the most frequent value of the sample.

Furthermore, as shown in FIGS. 10A, 10B, and 10C, the setting item list T7 becoming the evaluation target categorically includes setting items concerning the process, setting items concerning a scanner, setting items concerning a printer, and setting items concerning a system.

That is, the setting items concerning the process includes "a charging grid bias adjustment, a high-pressure manual adjustment charging, a high-pressure manual adjustment color development, a high-pressure manual adjustment primary transfer constant voltage, a high-pressure manual adjustment secondary transfer constant voltage, a high-pressure manual adjustment diselectrification blade, a high-pressure manual adjustment secondary constant current, a charging grid correction voltage value, a development bias correction voltage value, a laser power correction light quantity value, a laser power correction light standard D/A value, a Vo sensor output, a potential sensor output when a Vo sensor shutter is closed, a laser power output adjustment, a primary transfer bias standard mode execution value, a primary transfer resistance detection offset, a primary transfer front and back end bias execution value, a primary transfer front and back end bias correction coefficient, a secondary transfer bias color execution value, a secondary transfer bias monochrome execution value, a paper surface bias offset, a paper surface secondary front and back bias correction coefficient, a paper back surface secondary front and back end bias correction coefficient, a primary transfer constant current trans adjustment value, a primary transfer constant voltage trans adjustment value, a secondary transfer constant current trans adjustment value, a secondary transfer constant voltage trans adjustment value, a diselectrification bias adjustment value, a high-pressure manual adjustment diselectrification blade (high), a high-pressure manual adjustment primary transfer constant current, a fixation temperature (a heat roller), a heater compulsion ON time, a fixation temperature (a press roller), a first print pre-run operation time, an abnormal processing start fixation temperature setting, a compulsion heater ON number threshold value, a ready permission temperature range, a ready pre-run fixation motor deceleration, a ready pre-run operation time, a ready time fixation temperature, a ready temperature drop switch time, a print start permission temperature range, a print operation temperature maintaining time setting when the print is finished, a fixation control temperature lower limit, a print temperature drop switch time, a ready permission temperature correction at the time of preheat return, a time limit setting at the time of a sleep or preheat return, a print speed conversion temperature, an electric power variable lower limit, an electric power variable width, a lower limit maintaining temperature width at the time of an electric power drop, a heating time at the time of preheat, a control temperature maintaining time at the time of a sleep return, a fixation temperature transition time at the time of preheat, and a fixation temperature increment at the time of preheat transition".

Furthermore, the setting items concerning the scanner includes "a CCD main scanning deviation, a scanner minor scanning deviation, a scanner minor scanning magnification, a distortion, a shading position adjustment, an ADF aligning amount, an ADF conveyance speed fine adjustment, an ADF horizontal deviation, an ADF leading end position adjustment, and a carriage position adjustment at the time of ADF reading".

The setting item concerning the process printer includes "a polygon motor rotation fine adjustment, a laser embossing position, an ADU conveyance motor speed fine adjustment, a cassette horizontal deviation adjustment, an ADU horizontal deviation adjustment, a top margin, a left margin, a right margin, a bottom margin, a top margin, a left margin, a right margin, a bottom margin, a leading end position adjustment CST1 adjustment value, a leading end position adjustment CST2 adjustment value, a leading end position adjustment CST3 adjustment value, a leading end position adjustment CST4 adjustment value, a leading end position adjustment input adjustment value, a leading end position adjustment ADU adjustment value, a leading end position adjustment TLCF adjustment value, a leading end position adjustment OLCF adjustment value, a first cassette aligning amount, a second cassette aligning amount, an input paper feeding aligning amount, a third cassette aligning amount, a fourth cassette aligning amount, an ADU paper feeding aligning amount, a tandem LCF paper feeding aligning amount, an input pushing amount adjustment, a drum motor speed fine adjustment, a resist motor speed fine adjustment, a transfer belt motor speed fine adjustment, a heat roller speed fine adjustment, a paper feeding motor speed fine adjustment, a fixation paper ejecting motor speed fine adjustment, a skew deviation amount adjustment value, a polygon motor stop time, a paper feeding retry recovery setting value, a manual stay pull time-out time, and a positioning continuous print stop designation time [minute].

Furthermore, the setting item concerning the system includes "a default setting value of a blank determination adjustment threshold value at the time of power-on".

In addition, the configuration of the present exemplary embodiment mentioned above is merely an example, and a real installation is not limited thereto. For example, the database may be constituted by a single table and a plurality of tables (based on a relation data model), and may be replaced by a database such as a csv file.

Furthermore, by setting the serial number and the model name as a main key, it is possible to identify the image forming apparatus under the management including the server S regardless of an own product and other product. As another combination, the serial number, the maker name or the like can be used.

(Operation Screen of Maintenance Device)

Figure 11:
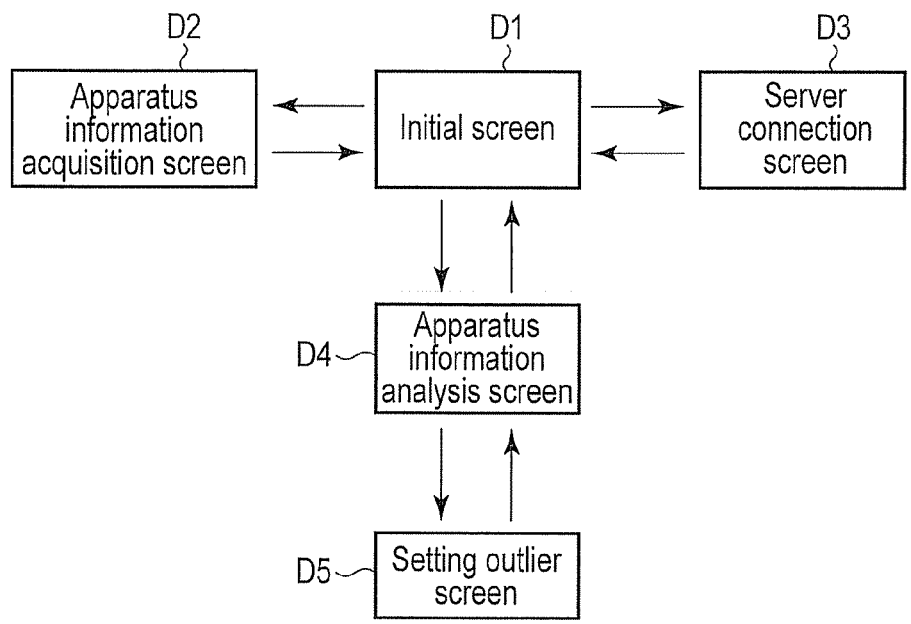
FIG. 11 is an explanatory diagram that illustrates an example of a transition of a screen of the maintenance device.

Next, as shown in FIG. 11, the maintenance device 10 of the present exemplary embodiment has a plurality of operation screens that are shifted from an initial screen D1. As shown in FIG. 11, in the initial screen D1, the screen of the application is shifted to an apparatus information acquisition screen D2 when an acquisition of apparatus information 51 is selected, the screen of the application is shifted to an apparatus information analysis screen D4 when an analysis of apparatus information 52 is selected, and the screen of the application is shifted to a server connection screen D3 when a connection to a server 53 is selected.

Figure 12:
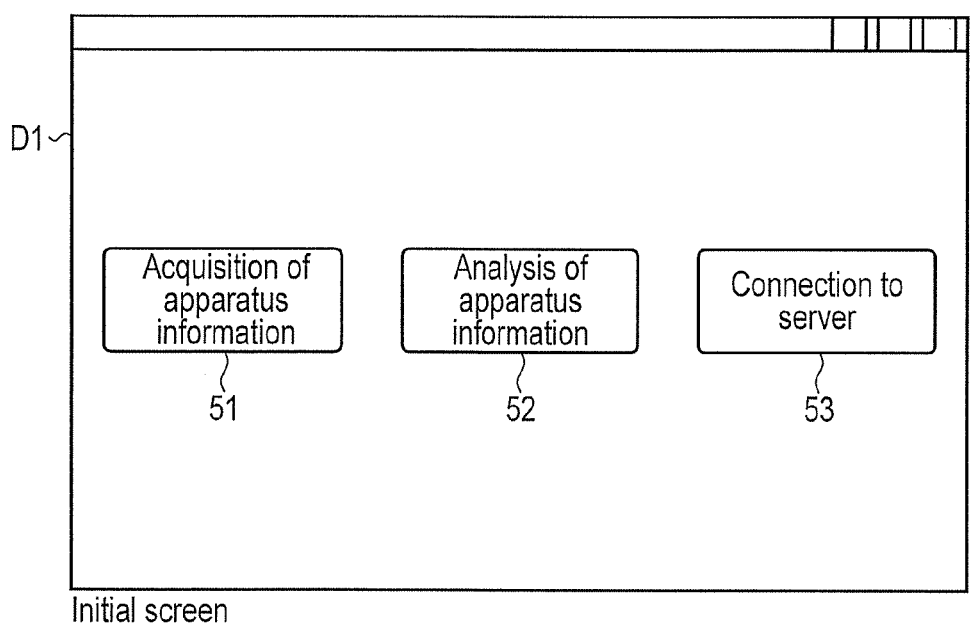
FIG. 12 is an explanatory diagram that illustrates an example of an initial screen D1 of the maintenance device.

As shown in FIG. 12, in the initial screen D1, three menus of "acquisition of apparatus information" 51, "analysis of apparatus information" 52, and "connection to server" 53 are prepared, and a user selects the menu to be executed among them by operating an input device 19. The operation information is input to the maintenance device 10 through an input device connection portion 15.

In addition, "apparatus" mentioned herein refers to an image forming apparatus M, and the image forming apparatus M is constituted by a printer, a scanner, a facsimile or the like.

Figure 13:
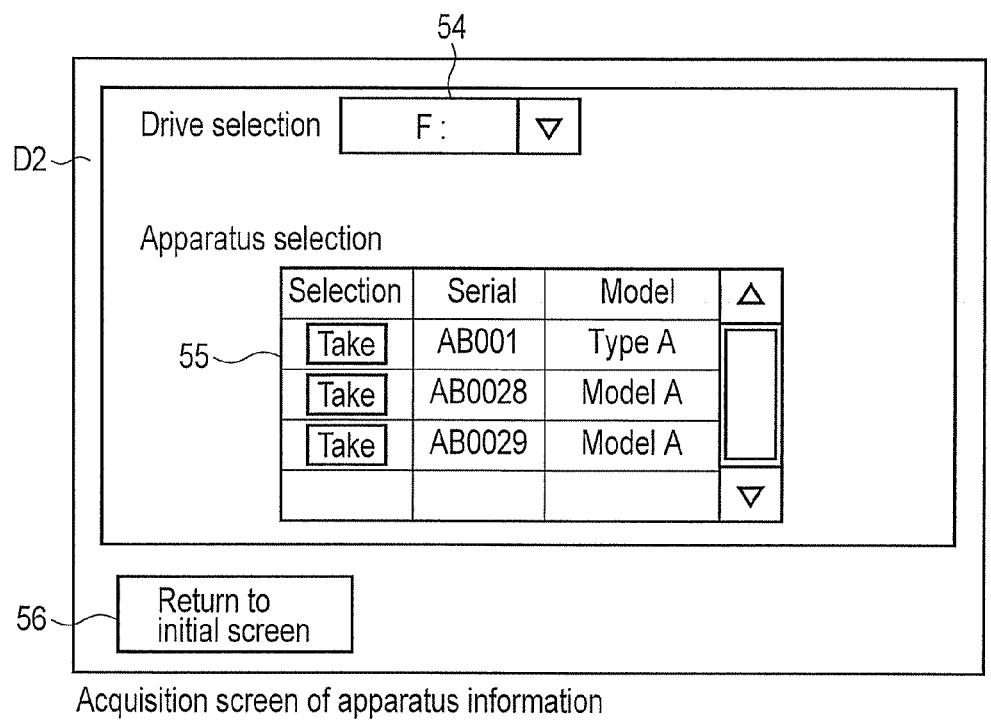
FIG. 13 is an explanatory diagram that describes an example of an apparatus information acquisition screen D2 of the maintenance device.

An example of the apparatus information acquisition screen D2 is shown in FIG. 13. The acquisition screen includes a drive selection 54 that designates an external recording device storing the data of the apparatus, and a button 56, return to the initial screen D1, and an apparatus selection list 55 that designates the data of which apparatus is input to the database.

Figure 14:
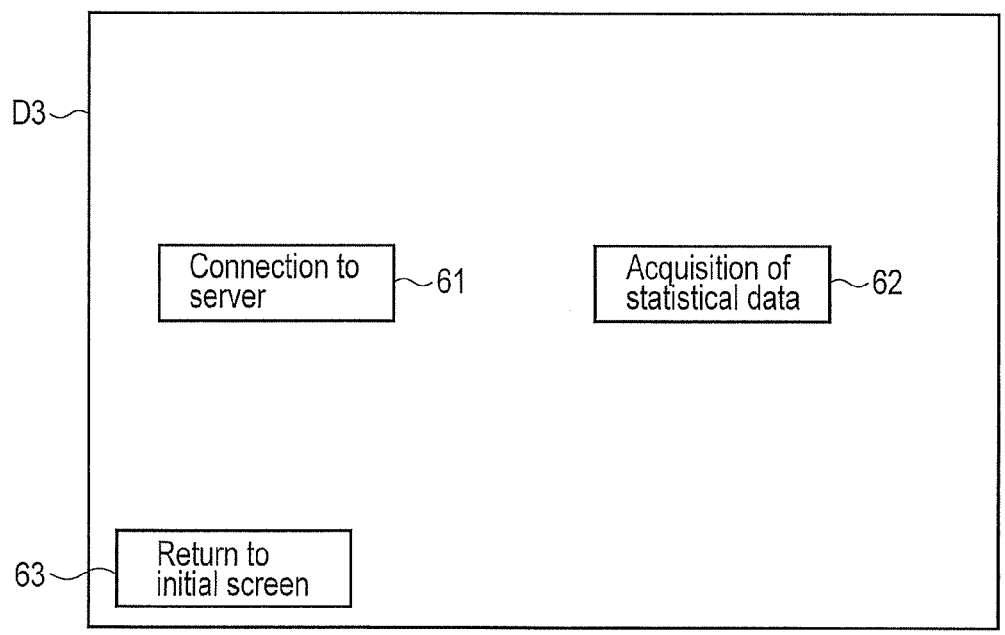
FIG. 14 is an explanatory diagram that describes an example of a server connection screen D3 of the maintenance device.

An example of the connection screen to the server S is shown in FIG. 14. The screen includes a connection button 61 and a statistical data acquisition button 62, and when the buttons are selected, the respective processes are executed. When the button 63, return to initial screen D1, is selected, the screen is shifted to the initial screen D1.

Figure 15:
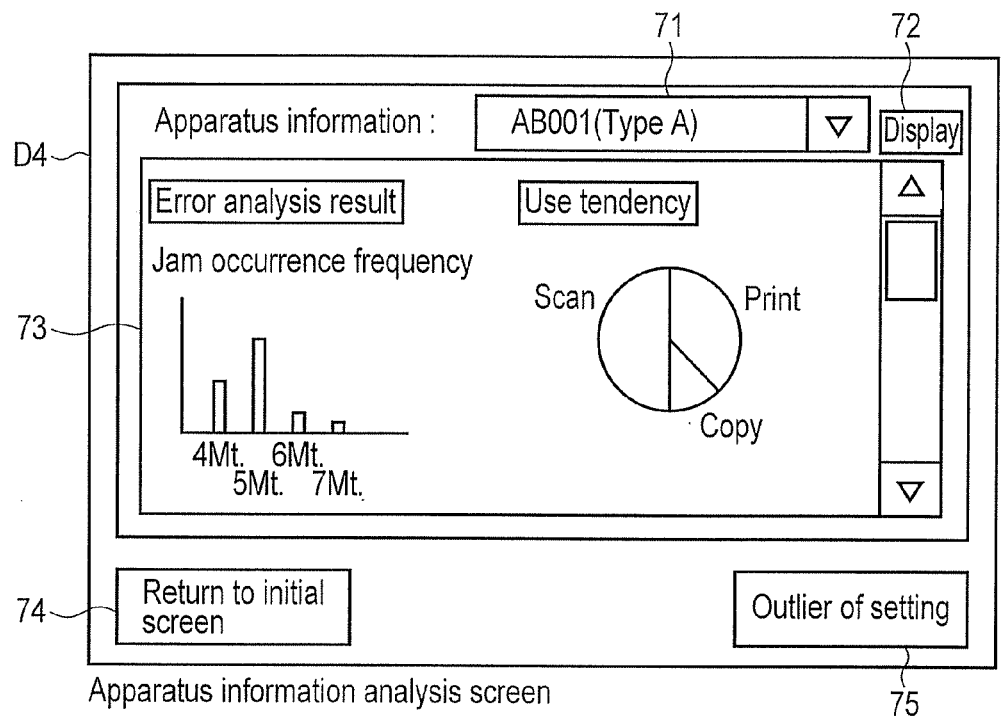
FIG. 15 is an explanatory diagram that describes an example of an apparatus information analysis screen D4 of the maintenance device.

An example of the apparatus information analysis screen D4 is shown in FIG. 15. Herein, when the display button 72 is pushed, the error information of the apparatus selected in the list 71 and the counter information such as a print number are analyzed and collected, and the tendency of error of the apparatus and the use situation are indicated by a chart on the analysis result display portion 73. When the button 74, return to the initial screen D1, is input, the screen is shifted to the initial screen D1. If the outlier button 75 of the setting is input, the screen of the application is shifted to the setting outlier screen D5. If there are many displaceable apparatuses, the apparatuses are selected from the list 71.

(Operation of Evaluation Device)

Figure 17:
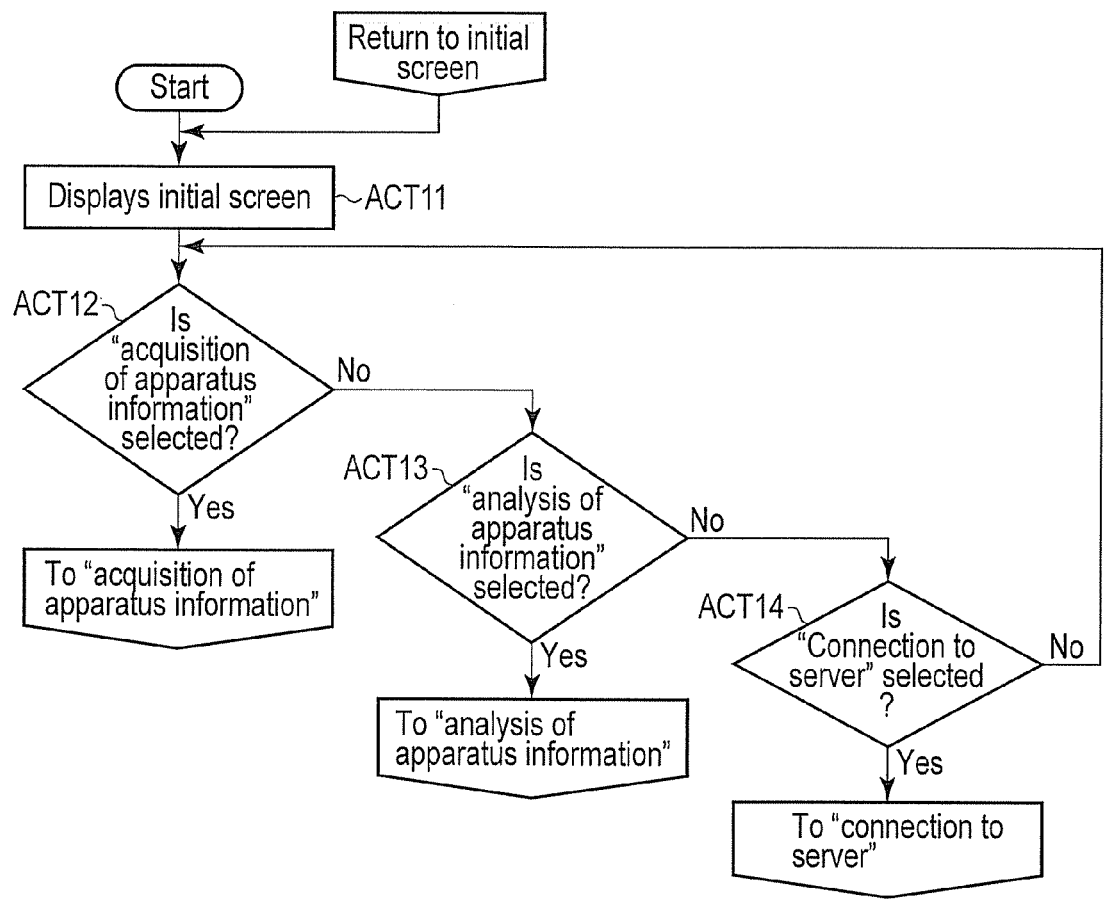
FIG. 17 is a flow chart that describes an example of a summary of an operation of the maintenance device.
Figure 18:
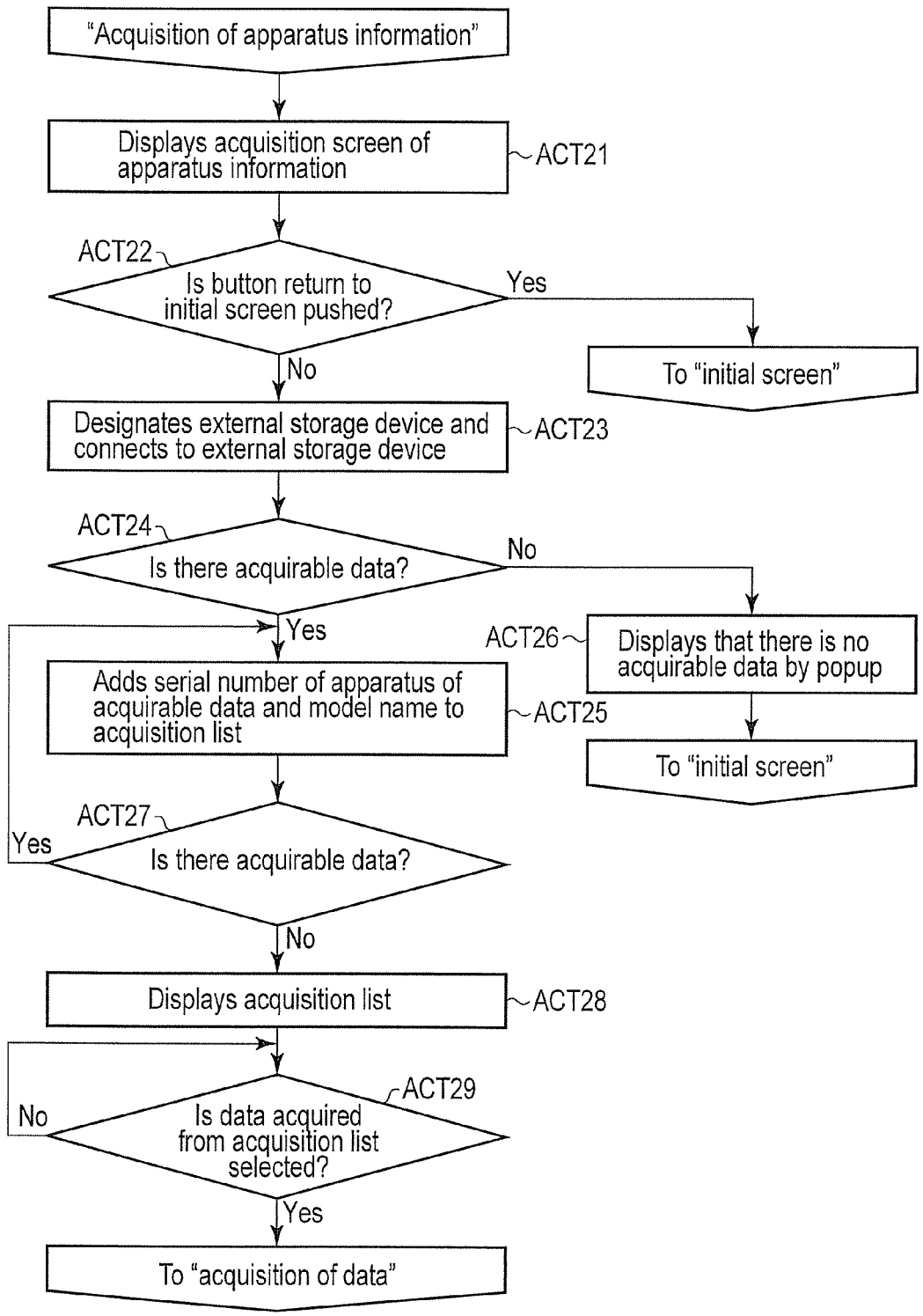
FIG. 18 is a flow chart that describes the "acquisition of apparatus information" of the maintenance device.
Figure 19:
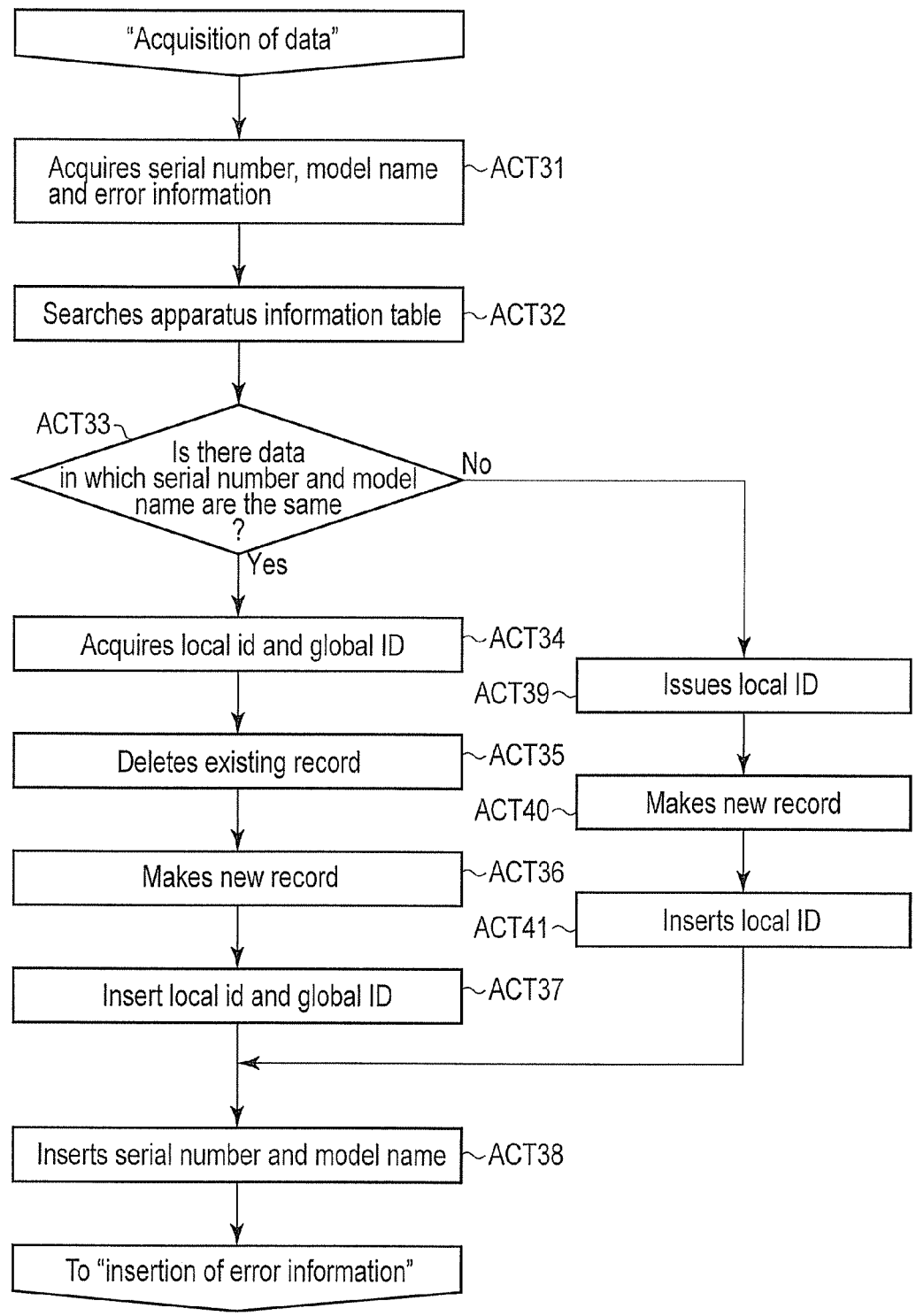
FIG. 19 is a flow chart that describes "acquisition of data" of the maintenance device.
Figure 23:
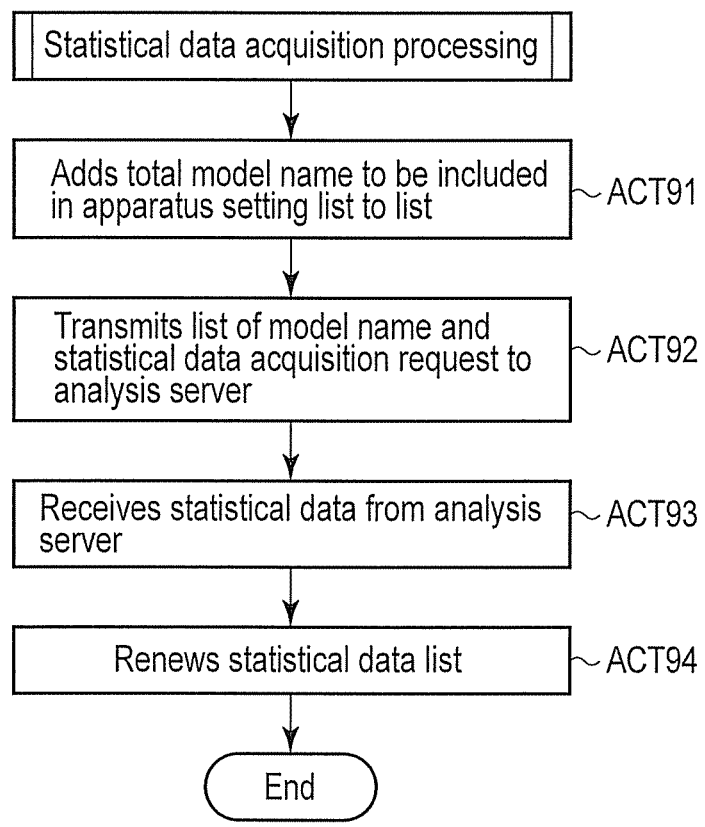
FIG. 23 is a flow chart that describes "statistical data acquisition processing" of the maintenance device.
Figure 25:
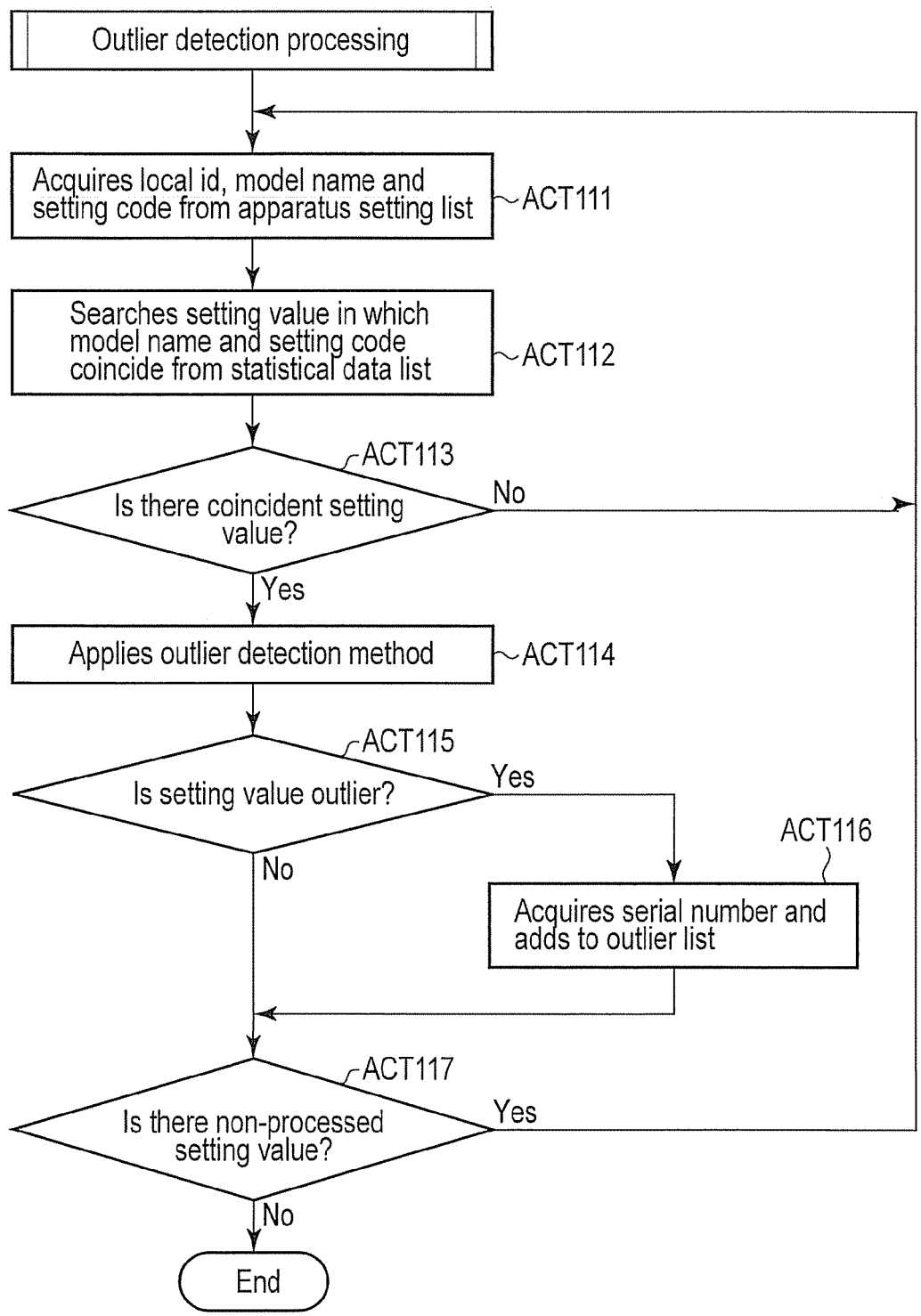
FIG. 25 is a flow chart that describes "outlier display processing" of the maintenance device.

An operation of the evaluation device of the present exemplary embodiment will be described below in detail using the flow chart. FIG. 17 is a flow chart that describes an example of a summary of an operation of the maintenance device. FIG. 18 is a flow chart that describes "acquisition of apparatus information". FIG. 19 is a flow chart that describes "acquisition of data". FIG. 20 is a flow chart that describes "insertion of error information". FIG. 21 is a flow chart that describes "analysis of apparatus information". FIG. 22 is a flow chart that describes "connection to a server". FIG. 23 is a flow chart that describes "statistical data acquisition processing". FIG. 24 is a flow chart that describes "outlier detection processing". FIG. 25 is a flow chart that describes "outlier display processing". FIG. 26 is an explanatory diagram of a situation where setting value of a development bias electric potential setting of the maintenance device is not suitable.

That is, as shown in the flow chart of FIG. 17, when the application is operated, the application executed by the processing portion 11 of the maintenance device 10 of the present exemplary embodiment displays the initial screen D1 on the display device 18 via the display device connection portion 14 (ACT 11), and awaits the input of a user from the input device 19. In the initial screen D1, if there is an operation that specifies the "acquisition of apparatus information", the processing portion 11 executes "the acquisition of apparatus information" (ACT 12). Furthermore, in the initial screen D1, if there is an operation that specifies "the analysis of apparatus information", the processing portion 11 executes "the analysis of apparatus information" (ACT 13). Furthermore, in the initial screen D1, if there is an operation that specifies "the connection to the server", the processing portion 11 executes "the connection to the server" (ACT 14).

Next, as shown by the flow chart of FIG. 17, when a user selects "the acquisition of the apparatus information" (ACT 12), the application executed by the processing portion 11 of the maintenance device 10 displays the apparatus information acquisition screen D2 (ACT 21). If the button, return to the initial screen D1, is selected (ACT 22), the screen returns to the initial screen D1.

If the button, return to the initial screen D1, is not pushed in ACT 22, the application executed by the processing portion 11 of the maintenance device 10 designates the external recording device by the drive selection 54, the application promotes the connection of an external recording device such as a USB memory to the external recording device connection portion 16 (ACT 23), and inspects whether or not there is data capable of being added to the database in the external recording device 1 (ACT 24). The data is stored so as to be taken out for each apparatus, and the acquisition of the data is performed for the data of each apparatus. If there is addable data, the application executed by the processing portion 11 of the maintenance device 10 adds the serial number and the model name of the apparatus having acquirable data to the apparatus selection list 55 (ACT 25).

If there is one or more acquirable data (ACT 27), the application executed by the processing portion 11 of the maintenance device 10 shows the apparatus selection list 55 to the acquisition screen D2 (ACT 28), and selects which data is acquired (ACT 29). If there is no acquirable data, that effect is transmitted by a popup window (ACT 26), and when a user approves, the screen returns to the initial screen D1.

If the acquired data is determined, the serial number, the model number and the error information of the selected apparatus are acquired (ACT 31). Among them, the apparatus information table T1 in the database is scanned based on the serial number and the model name (ACT 32), it is inspected whether or not the data of the same apparatus as the acquired data is present (ACT 33).

At this time, the application scans the acquired data and the serial numbers and the model names of each data item in the database. If the data acquired by the two items coincides with any data in the database (ACT 33), this is determined as the "same apparatus", and the processing of "situation where the same apparatus is present" mentioned below is performed. If there is no data that coincides with the acquired data, the processing of "situation where the same apparatus is not present" mentioned below is performed.

If the same apparatus is present, the same global ID and local ID as the existing data are issued in the acquired data (ACT 34), after deleting the existing data (ACT 35), a new record is made (ACT 36), and the local ID, the global ID, the serial number and the model name of the acquired record are inserted to the apparatus information table T1 (ACT 37, ACT 38).

If the same apparatus is not present (ACT 33), the local ID is newly issued (ACT 39). At this time, the local ID is determined so as not to overlap in the application. For example, the local ID takes a positive integral value, and if the local ID is newly issued, the local ID adds +1 to the maximum value of issued local IDs. In this method, the local ID is increased by one whenever being issued, and due to this, local IDs do not overlap. After making a new record on the apparatus information table T1 (ACT 40), the local ID, the serial number and the model name of the acquired data are inserted (ACT 41, ACT 38).

Next, the application executed by the processing portion 11 of the maintenance device 10 inserts the error information according to FIG. 20. Although it is assumed that the error information differs depending on the model and the maker, the standardization of the data also proceeds, and it is considered that information of a certain degree can be acquired common to each apparatus. Thus, in order to acquire more information, the error information is acquired while absorbing the error between the apparatuses using the database column name and the log data title correspondence table T3 (ACT 31).

The error information refers to data other than the serial number and the model name, and there is a possibility that data such as a drive time and a print number directly unrelated to the error is also included. Furthermore, the error information is constituted by the title (the kind of the data) and the data (the value).

Firstly, it is determined whether or not non-checked data is present in the error information (ACT 51). This is determined by the own position or the like to the length of the arrangement of the error information. If non-checked data is present, the title of the data is acquired (checked) (ACT 52). If the acquired title is not the same as the title existing in the column name of the error information table T2 (ACT 53), the database column name and the log data title correspondence table T3 is referred to (ACT 56), and if the title is present in the correspondence table T3 (ACT 57), the insertion place of the data is changed to the corresponding column (ACT 58).

If the title is not present in the correspondence table, the process proceeds to ACT 51, the data is not acquired, and the process proceeds to the determination of whether or not the non-checked data is present.

Furthermore, in the correspondence table, the column name of the database and the title of the error information corresponding thereto are recorded, and it is possible to correct a difference in title of the error information by referring the column name and the title.

If the non-checked data is not present, the check of the error information is finished, and the screen returns to the initial screen D1. The data corresponding to the acquired title is acquired, and if the form of the data coincides with the data form of the column of the data insertion place (ACT 54), the data is inserted (ACT 55), and if the form of the data does not coincide with the data form of the column of the data insertion place (ACT 54), after converting the acquired data into the data form of the column of the data insertion place (ACT 59), the data is inserted (ACT 55). Moreover, the process returns to ACT 51, and it is determined whether or not the non-checked data is present.

(Analysis of Apparatus Information)

Next, analysis processing of the apparatus information will be described using the flow chart of FIG. 21. If a user selects "analysis of the apparatus information" 52 in the initial screen D1 (ACT 13), the application executed by the processing portion 11 of the maintenance device 10 indicates the apparatus information analysis screen D4 shown in FIG. 15 (ACT 61). That is, the application executed by the processing portion 11 of the maintenance device 10 scans the apparatus information table T1 in the database (ACT 62), and inspects whether or not there is analyzable data (ACT 63). If there is one or more analyzable data item, when the display button 72 is pushed (ACT 65), the value of the selected list 71 is acquired (ACT 66), the data of the selected apparatus is analyzed (ACT 67), and the analysis result of the selected apparatus is displayed (ACT 68).

The button 74, return to the initial screen D1, is placed in the analysis result, and if the button 74 is pushed (ACT 69), the screen returns to the initial screen D1. If the outlier button 75 of the setting is pushed (ACT 70), the process proceeds to the flow chart of FIG. 24 and is shifted to the setting outlier screen D5 shown in FIG. 16.

As shown in the flow chart of FIG. 24, the application executed by the processing portion 11 of the maintenance device 10 displays the setting outlier screen D5 (ACT 101), and executes outlier detection processing described below using the flow chart of FIG. 25 (ACT 102). In addition, if the returning button 74 is pushed (ACT 103), the application executed by the processing portion 11 of the maintenance device 10 returns to the apparatus information analysis screen D4.

(Connection Processing to Server S)

Next, connection processing to the server S will be described below using the flow chart of FIG. 22. If a user selects the "connection to the server S" on the initial screen D1 of FIG. 12 (ACT 14), the application executed by the processing portion 11 of the maintenance device 10 displays the server S connection screen D3 (ACT 71). Herein, if the button 62, acquire the statistical data is selected (ACT 81), the statistical data acquisition processing is performed (ACT 82). Furthermore, the button 63, return to the initial screen D1, is selected (ACT 83), the screen returns to the initial screen D1. Furthermore, if the button 61, connect to the server S, is selected (ACT 72), the application checks whether it is possible to access the data collecting server S through the internet connection portion 17 (ACT 73).

If it is not possible to confirm that the server can be accessed in ACT 73, the application executed by the processing portion 11 of the maintenance device 10 displays that the server S cannot be accessed by popup (ACT 80), and the screen returns to the initial screen D1. If it is possible to confirm that the server S can be accessed, the application executed by the processing portion 11 of the maintenance device 10 searches the apparatus information table T1 in the database (ACT 74), and inspects whether or not there is data to which the global ID is not yet allocated (ACT 75). If there is data to which a global ID is not yet allocated, the application uploads the serial number and the model name to the server S, and requires the issue of the global ID (ACT 76). If a global ID is issued from the server S, the global ID is received and is inserted to the global ID column (ACT 77).

Furthermore, in ACT 75, if the ID is allocated to the application itself, or if the server S can discriminate the application accessing to the server S by some methods such as a MAC address, the application executed by the processing portion 11 of the maintenance device 10 is also able to require the global ID by uploading the local ID (and information for recognizing the application) instead of uploading the serial number and the model name.

However, when considering a situation where a plurality of servicemen visit the same apparatus, it is desirable to upload information such as the serial number and the model name which can specify the apparatus without depending on the application.

If a global ID is assigned to all the apparatuses, the application executed by the processing portion 11 of the maintenance device 10 determines whether or not a non-uploaded apparatus is present (ACT 78). If a non-uploaded apparatus remains, the application uploads the global ID and the error information to the server S (ACT 79). Setting information of the apparatus can also be uploaded in addition to the error information. The setting of the apparatus is, for example, setting items concerning the operation of the image forming apparatus such as the adjustment of the scan position, the up, down, left and right margin adjustment of the paper, and the speed adjustment of the motor. Otherwise, an item indicating the apparatus state such as a version of a firmware is also included. A user is able to alter the setting value from the state at the time of factory shipment according to the use frequency and the application of the apparatus.

At this time, in some cases, an unintentional setting value is erroneously set, or an uncommon setting value is set. Since any value is reflected as setting, the value itself cannot be referred to as an error, and it is difficult for the person in question to notice. However, by the continuous operation in that state, consequentially, there is a high possibility that the apparatus potentially generates the error, depending of the combination of the setting values.

FIG. 26 is an explanatory diagram of a situation where the setting value of development bias electric potential setting of the maintenance device. In FIG. 26, if (1) is set to a development bias potential, (2) is an exposure electric potential of a middle length, and (2) is an exposure electric potential of a solid image, development is performed in a case of (1)<(2), but when (1)>(2), in some cases, development is not performed. If the setting value is not suitable, in some cases, an inconvenience may occur. However, in order to prevent an inconvenience, it is desirable to indicate a user how the setting value of the apparatus deviates from the general setting method.

The setting information of the apparatus is preserved as a table structure similar to that in the apparatus setting list T4 shown in FIG. 7 in the database of the maintenance device 10. The apparatus setting list T4 is constituted by the local ID, the model name, the setting code and the setting value. The respective setting items are expressed by the setting codes, and a certain item is identified by the model name and the setting code.

In order to determine an outlier of a setting (that is, a deviation degree), firstly, there is a need to know the average setting value, and the value is acquired from the analysis server S as the statistical data. As shown in FIG. 3, the analysis server S is connected by the image forming apparatus M and the network N of the market, and with regard to the image forming apparatus M in which the permission of the installation location is provided, the error information and the setting information such as the maker name and the serial number are regularly collected. The statistical data is calculated on the analysis server S in advance based on the apparatus data of the market collected via the network N and the data collected from the apparatus of the network non-connection using the maintenance device 10 and is regularly renewed.

The statistical data is basically data which is made up for the average value, the standard deviation, and the sample number for each code of each type of the apparatus. In addition, if the setting value is not continuous, for example, when an attribute is a nominal scale, since an average value cannot be found, the mode is found. Furthermore, in order to determine the outlier, there are threshold values (an upper limit and a lower limit) that are designed for each setting. The values are setting ranges assumed at the time of design of the image forming apparatus or empirically determined values. The average value may be a median but not an arithmetical average depending on characteristics of the setting item. If a plurality of settings have a connection with each other, covariance between setting values is found and is included in the statistical data, and thus can also be used in the detection of outliers using Mahalanobis distance described later.

In order to raise the detection accuracy of outliers, it is of course possible to acquire more data such as an enormous amount of raw data before gathering but not the statistical data from the server S. However, the maintenance device 10 is a mobile terminal conveyed by the serviceman, and when considering the limited functions of the CPU, the storage capacity or the like, it is preferable that the data downloaded and reserved from the server S is smaller.

The sequence by which the maintenance device 10 acquires the statistical data from the analysis server S will be described using the flow chart shown in FIG. 23. If the statistical data acquisition button 62 is input on the server S connection screen D3, the application executed by the processing portion 11 of the maintenance device 10 starts the acquisition processing of the statistical data. Firstly, all the model names included in the apparatus setting list T4 are acquired as the list except for the overlap (ACT 91). Moreover, the model name list and the statistical data acquisition request are transmitted to the analysis server S (ACT 92). The analysis server S transmits the statistical data list calculated in advance for the model name corresponding to the received model name list, and the list is received via the maintenance device 10 (ACT 93). The existing statistical data list T5 is updated to the newly acquired statistical data list (ACT 94). In this manner, the acquisition processing of the statistical data is finished.

A structure of the statistical data list T5 of the setting value is illustrated in FIG. 8. Herein, the structure is constituted by the model name, the setting code, the sample number, the average value, the mode, the standard deviation, and the threshold value. The sample number is an apparatus number that is used in calculating the statistical data.

Figure 16:
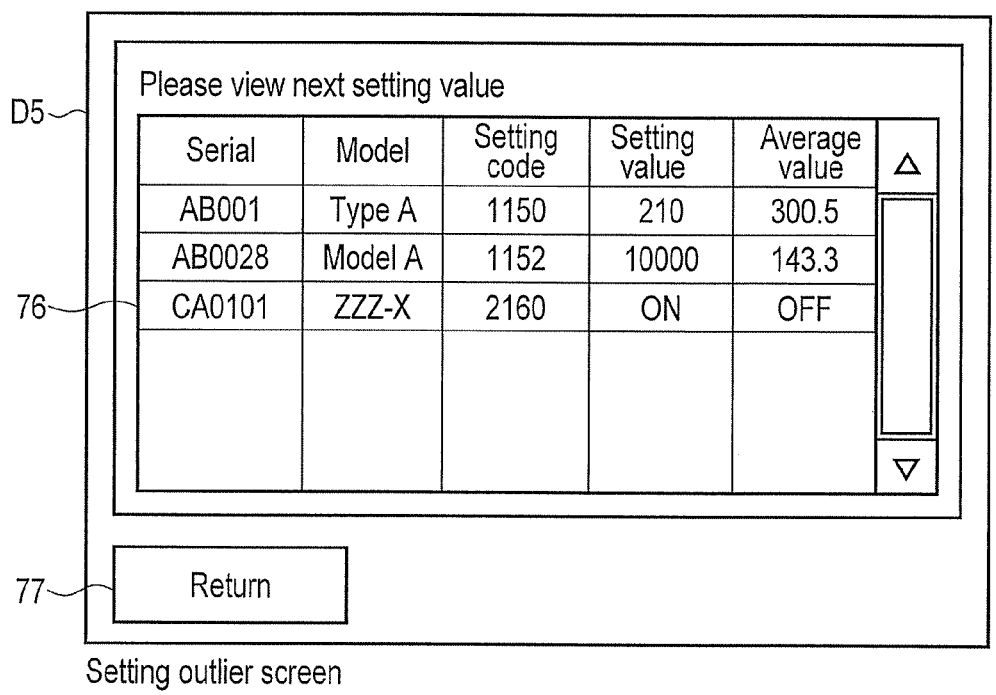
FIG. 16 is an explanatory diagram that describes an example of a setting outlier screen D5 of the maintenance device.

If the outlier button 75 of the setting is selected on the apparatus information analysis screen D4, the application executed by the processing portion 11 of the maintenance device 10 performs the outlier detection process shown in FIG. 24, and the screen is shifted to the outlier screen of the setting shown in FIG. 16. The outlier detection processing may be executed parallel to taking the apparatus information from the external recording device, and may be arbitrarily executed by a user to the already taken data. Herein, the latter case will be described.

The outlier detection processing is performed on all the data included in the apparatus setting list T4. Herein, the order of the outlier detection processing will be described according to the flow chart of FIG. 25. The application executed by the processing portion 11 of the maintenance device 10 takes out the local ID, the model name, the setting code, and the setting value from the apparatus setting list T4 of FIG. 7 (ACT 111). Furthermore, the application executed by the processing portion 11 of the maintenance device 10 searches a line in which the setting code coincides with the model name from the statistical data list T5 (ACT 112). If there is a coincident line (Y of ACT 113), the average value, the standard deviation, and the threshold value are acquired, and the outlier detection method is applied (ACT 114). If there is no coincident line (N of ACT 113), the process returns to ACT 111 and is moved to the next setting code processing.

In ACT 114, if the setting item is in a nominal scale and the average value is not calculated, the mode is acquired, and if the setting value does not coincide with the mode, the value is set to the outlier. If an outlier is determined in ACT 114 (Y of ACT 115), a line corresponding to the local ID is searched from the apparatus information table T1, the serial number is acquired, and the serial number, the model name, the setting code, the setting value and the mode are added to the outlier list T6 as shown in FIG. 9 (ACT 116). Such processing is continued until a non-processed setting value disappears (ACT 117).

Herein, if there is an average value in the setting value, the outlier detection method is applied. The outlier detection method will be described later. If the setting value is an outlier, a line corresponding to the local ID is searched from the apparatus information table T1, and the serial number is acquired. Moreover, the serial number, the model name, the setting code, the setting value, the average value, and the mode are added to the outlier list T6. The process is performed on the model name and the setting code that are registered in the apparatus setting list T4.

Herein, the detection method of an outlier will be described.

There is a method of supposing that the setting value follows the normal distribution, and considering the setting value as the outlier if the setting value deviates from the average value by more than three times the standard deviation. If the setting value is x, the average is μ and the standard value is σ, a setting value satisfying the following condition formula is identified as an outlier.

$$|x-\mu|/\sigma > 3$$

This method is general as an outlier detection method, and is generally used. Twice the standard deviation may be used instead of three times, and then more setting values can be taken out as the outlier. Mahalanobis distance may be used in the outlier detection. Mahalanobis distance DM is defined as Formula 1.

$$D_M = \sqrt{(x-\mu)^T \Sigma^{-1}(x-\mu)} \quad \text{Formula 1}$$

Herein, Σ indicates a variance-covariance matrix. A plurality of setting values has relations each other, if the variance-covariance matrix is calculated by the analysis server S in advance, the formula may be used. Mahalanobis distance when there is no setting values having relations each other and a single setting value is evaluated is Formula 2 as below.

$$D_M = \sqrt{((x-\mu)/\sigma)^2} \quad \text{Formula 2}$$

If the value exceeds the threshold value, the value x is determined as an outlier.

In the respective setting items, there are ranges of the recommended setting defined at the design stage, and a value exceeding the range can be considered as the outlier. If the lower limit of the threshold value is θl and the upper limit of the threshold value is θh, the setting value x satisfying the next formula becomes the outlier.

$$X < \theta l, \theta h < x$$

As mentioned above, although three kinds of outlier detection methods were described, the methods are not limited thereto. For example, it is also possible to adopt a method of statistically selecting the outlier using a method such as Smirnoff-Groves test.

If the outlier detection processing is finished, the contents of the outlier list T6 are displayed on the outlier display portion 76 to draw a user's attention. At this time, for a setting code not having the average value, the mode is displayed instead. A display example of the outlier screen of the setting is shown in FIG. 16. In this manner, the setting items that are set as not general for each apparatus are listed, and the index that serves as the reference of the setting is indicated, whereby a user is encouraged to review the setting value, and it is possible to prevent a potential error in advance.

In this manner, as mentioned above, in the maintenance device 10 according to the present exemplary embodiment, based on the market data statistical information collected by the server S, the statistical value of the apparatus setting is compared to the apparatus setting, the outlier (the comparison result) is detected and suggested on the screen of the maintenance device 10. As a result, if a serviceman maintains the image forming apparatus at the installation location, it is possible to provide means for detecting and suggesting the outlier of the apparatus setting, and it is possible to prevent the occurrence of an error in advance by adjusting the setting on the spot.

Furthermore, the process shown in the exemplary embodiment mentioned above may be realized by hardware, and can be realized by a computer program (a maintenance program) that is stored in the recording portion 13 such as memory executed by a processing portion 11 such as a CPU. Thus, the present exemplary embodiment can also be understood as hardware such as an electronic circuit and can also be understood as the computer program. In the description, although a situation was described where the program realizing the processing shown in the present exemplary embodiment is recorded (installed) in the maintenance device in advance, the maintenance device may download the computer program from the network and record (install) the downloaded program, and the maintenance device may read the computer program from a storage medium and record (install) the read computer program, without being limited thereto. As the recording medium, if a recording medium capable of storing the computer program and being read by the maintenance device is used, the form thereof may be any form. Furthermore, the maintenance device is also able to realize the processing shown in the present exemplary embodiment through the cooperation of the OS (operating system) stored in the device and recorded (installed) computer program.

In addition, in the present exemplary embodiment, although an image forming apparatus was described as an apparatus of the maintenance target of the maintenance device as an example, the apparatus of the maintenance target of the maintenance device is not limited to an image forming apparatus. The maintenance device is able to maintain various information processing devices. For example, the maintenance device is able to maintain a POS (point of sale system) terminal installed in commercial facilities or the like.

According to the exemplary embodiment, it is possible to provide a maintenance device and a maintenance method which perform maintenance of an information processing device based on the setting value of the information processing device such as an image forming apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A maintenance device comprising:
   a first interface configured to read first setting information from an information processing device of a non-connected network;
   a second interface configured to acquire statistical information from an external device via a network, the statistical information concerning second setting information received from other information processing devices by the external device and being regularly updated based on the second setting information; and
   a processor configured to compare the first setting information to the statistical information and evaluate the first setting information based on a comparison result,
   wherein the second interface is configured to transmit the first setting information to the external device via the network to further update the statistical information at the external device based on the first setting information from the information processing device.

2. The device of claim 1, wherein the second interface is configured to acquire machine type identification information of the information processing device and the statistical information corresponding to a setting item of the first setting information.

3. The device of claim 1, wherein the processor is configured to find an outlier that indicates a deviation degree of a setting value indicated by the first setting information from a statistical value indicated by the statistical information, and is configured to evaluate the first setting information based on the outlier.

4. The device of claim 1, wherein the first interface is configured to read apparatus identification information from the information processing device via the reading unit, and
the second interface is configured to transmit the apparatus identification information to the external device, and is configured to receive allocation identification information allocated to the information processing device from the external device.

5. The device of claim 4, wherein the second interface is configured to transmit the first setting information to an external device, corresponding to the allocation identification information.

6. A maintenance method comprising:
reading first setting information with a first interface from an information processing device of a non-connected network;
acquiring statistical information with a second interface from an external device via a network, the statistical information concerning second setting information received from other information processing devices by the external device and regularly updated based on the second setting information;
transmitting the first setting information to the external device with the second interface via the network to further update the statistical information at the external device based on the first setting information from the information processing device;
comparing the first setting information to the statistical information using a processor; and
evaluating the first setting information based on a comparison result using the processor.

7. The method of claim 6, further comprising:
acquiring machine type identification information of the information processing device and the statistical information corresponding to a setting item of the first setting information.

8. The method of claim 6, further comprising:
finding an outlier that indicates a deviation degree of the setting value indicated by the first setting information from a statistical value indicated by the statistical information; and
evaluating the first setting information based on the outlier.

9. The method of claim 6, further comprising:
reading apparatus identification information from the information processing device;
transmitting the apparatus identification information to the external device; and
receiving allocation identification information allocated to the information processing device from the external device.

* * * * *